US011005708B1

(12) United States Patent
Gheorghe et al.

(10) Patent No.: US 11,005,708 B1
(45) Date of Patent: *May 11, 2021

(54) TECHNIQUES TO PERFORM THE DYNAMIC CONFIGURATION OF LOAD-BALANCED RELAY OPERATIONS

(71) Applicant: WhatsApp Inc., Menlo Park, CA (US)

(72) Inventors: Claudiu Dan Gheorghe, San Mateo, CA (US); Erik James Reed, Dublin, CA (US); Ehren Andrew Kret, Sunnyvale, CA (US)

(73) Assignee: WHATSAPP INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/789,786

(22) Filed: Feb. 13, 2020

Related U.S. Application Data

(63) Continuation of application No. 15/201,170, filed on Jul. 1, 2016, now Pat. No. 10,567,217.

(60) Provisional application No. 62/301,173, filed on Feb. 29, 2016, provisional application No. 62/301,161, filed on Feb. 29, 2016.

(51) Int. Cl.
| | | |
|---|---|---|
| *G06F 15/177* | (2006.01) | |
| *H04L 12/24* | (2006.01) | |
| *H04L 29/08* | (2006.01) | |
| *H04L 29/06* | (2006.01) | |
| *H04L 12/26* | (2006.01) | |
| *H04B 7/155* | (2006.01) | |

(52) U.S. Cl.
CPC ..... *H04L 41/0803* (2013.01); *H04B 7/15507* (2013.01); *H04L 43/087* (2013.01); *H04L 65/60* (2013.01); *H04L 65/605* (2013.01); *H04L 65/80* (2013.01); *H04L 67/1004* (2013.01); *H04L 67/146* (2013.01); *H04L 67/28* (2013.01); *H04L 67/42* (2013.01); *H04L 63/0428* (2013.01); *H04L 63/168* (2013.01)

(58) Field of Classification Search
CPC ............... H04L 41/0803; H04L 43/087; H04L 63/0428; H04L 63/168; H04L 65/60; H04L 65/605; H04L 65/80; H04L 67/1004; H04L 67/146; H04L 67/28; H04L 67/42; H04B 7/15507
USPC .......................... 709/220, 224, 213, 214, 226
See application file for complete search history.

(56) References Cited

U.S. PATENT DOCUMENTS

| | | | | |
|---|---|---|---|---|
| 2014/0082217 A1* | 3/2014 | Lohner | ............... | H04L 61/2589 709/245 |
| 2016/0014131 A1* | 1/2016 | Neafsey | .................. | H04L 63/08 713/171 |
| 2016/0164680 A1* | 6/2016 | Liao | ...................... | H04L 9/3213 713/155 |

* cited by examiner

*Primary Examiner* — Kaylee J Huang
(74) *Attorney, Agent, or Firm* — Kacvinsky Daisak Bluni PLLC

(57) ABSTRACT

Techniques to perform the dynamic configuration of load-balanced relay operations are described. In one embodiment, an apparatus may comprise a first load balancer component, a second load balancer component, a first relay server component, a second relay server component, and a persistent shared-memory storage component. The apparatus may be operative to perform the dynamic configuration of load-balanced relay operations for a two-tier relay system using persistent shared-memory storage in which a session identifier received from client devices is used to coordinate the activities of the relay server components based on information shared via the persistent shared-memory storage component. Other embodiments are described and claimed.

20 Claims, 13 Drawing Sheets

700

Receive a first-client relay bind request from a first load balancer component at a first relay server component, the first-client relay bind request forwarded from the first load balancer component after reception from a first client device, the first client device associated with a first network address, the first relay bind request associated with a first client device identifier for the first client device.
702

Extract a session identifier from the first-client relay bind request by the first relay server component.
704

Register the first client device in association with the session identifier in a persistent shared-memory storage component by the first relay server component.
706

Receive a second-client relay bind request from a second load balancer component at a second relay server component, the second-client relay bind request forwarded from the second load balancer component after reception from a second client device, the second-client relay network packet associated with a second client device identifier for the second client device.
708

Extract the session identifier from the second-client relay bind request.
710

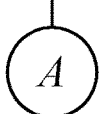

Access the persistent shared-memory storage component based on the session identifier.
712

Retrieve the first network address based on accessing the persistent shared-memory storage component based on the session identifier.
714

Associate the first network address as a relay destination for the second client device.
716

Receive a second-client relay network packet from the second load balancer component, the second-client relay network packet forwarded from the second load balancer component after reception from the second client device.
718

Identify the second client device based on the second network address.
720

Transmit the second-client relay network packet to the first client device based on the first network address in response to identifying the second client device based on the second network address.
722

*FIG. 7B*

TECHNIQUES TO PERFORM THE DYNAMIC CONFIGURATION OF LOAD-BALANCED RELAY OPERATIONS

CROSS-REFERENCE TO RELATED APPLICATIONS

This application is a continuation of and claims the benefit of priority to U.S. patent application Ser. No. 15/201,170, titled "Techniques to Perform the Dynamic Configuration of Load-Balanced Relay Operations," filed on Jul. 1, 2016, now issued U.S. Pat. No. 10,567,217, issued on Feb. 18, 2020, which is hereby incorporated by reference in its entirety.

This application claims the benefit of priority under 35 U.S.C. § 119(e) to U.S. Provisional Patent Application No. 62/301,173, titled "Techniques to Perform the Dynamic Configuration of Load-Balanced Relay Operations,", filed on Feb. 29, 2016, which is hereby incorporated by reference in its entirety.

This application claims the benefit of priority under 35 U.S.C. § 119(e) to U.S. Provisional Patent Application No. 62/301,161, titled "Techniques to Provide Relay Server Configuration for Geographically Disparate Client Devices,", filed on Feb. 29, 2016, which is hereby incorporated by reference in its entirety.

BACKGROUND

Users of mobile devices, such as smartphones, may use their mobile devices to execute applications. These applications may perform communications and network tasks on behalf of their user. An application may comprise a communications application for communication between users. This communication may include the transmission of streaming content, including streaming audio content such as a voice-over-Internet-Protocol (VoIP) communication exchange.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to perform the dynamic configuration of load-balanced relay operations. Some embodiments are particularly directed to techniques to perform the dynamic configuration of load-balanced relay operations for a two-tier relay system using persistent shared-memory storage. In one embodiment, for example, an apparatus may comprise a first load balancer component operative to receive a first-client relay bind request from a first client device, the first client device associated with a first network address, the first relay bind request associated with a first client device identifier for the first client device; determine a first relay server component based on the first client device identifier by applying a hashing function to the first client device identifier; and forward the first-client relay bind request to the first relay server component; the first relay server component operative on the processor circuit to receive the first-client relay bind request from the first load balancer component; extract a session identifier from the first-client relay bind request; and register the first client device in association with the session identifier in a persistent shared-memory storage component; a second load balancer component operative to receive a second-client relay bind request from a second client device, the second-client relay bind request associated with a second client device identifier for the second client device; determine a second relay server component based on the second client device identifier by applying the hashing function to the second client device identifier; forward the second-client relay bind request to the second relay server component; receive a second-client relay network packet from the second client device, the second-client relay network packet associated with the second client device identifier for the second client device; determine the second relay server component based on the second client device identifier by applying the hashing function to the second client device identifier; and forward the second-client relay network packet to the second relay server component; the second relay server component operative to receive the second-client relay bind request from the second load balancer component; extract the session identifier from the second-client relay bind request; access the persistent shared-memory storage component based on the session identifier; retrieve the first network address based on accessing the persistent shared-memory storage component based on the session identifier; associate the first network address as a relay destination for the second client device; receive the second-client relay network packet from the second load balancer component; identify the second client device based on the second network address; and transmit the second-client relay network packet to the first client device based on the first network address in response to identifying the second client device based on the second network address. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 7A illustrates an embodiment of a first portion of a logic flow for the system of FIG. 1.
FIG. 7B illustrates an embodiment of a second portion of a logic flow for the system of FIG. 1.

DETAILED DESCRIPTION

Figure 1:
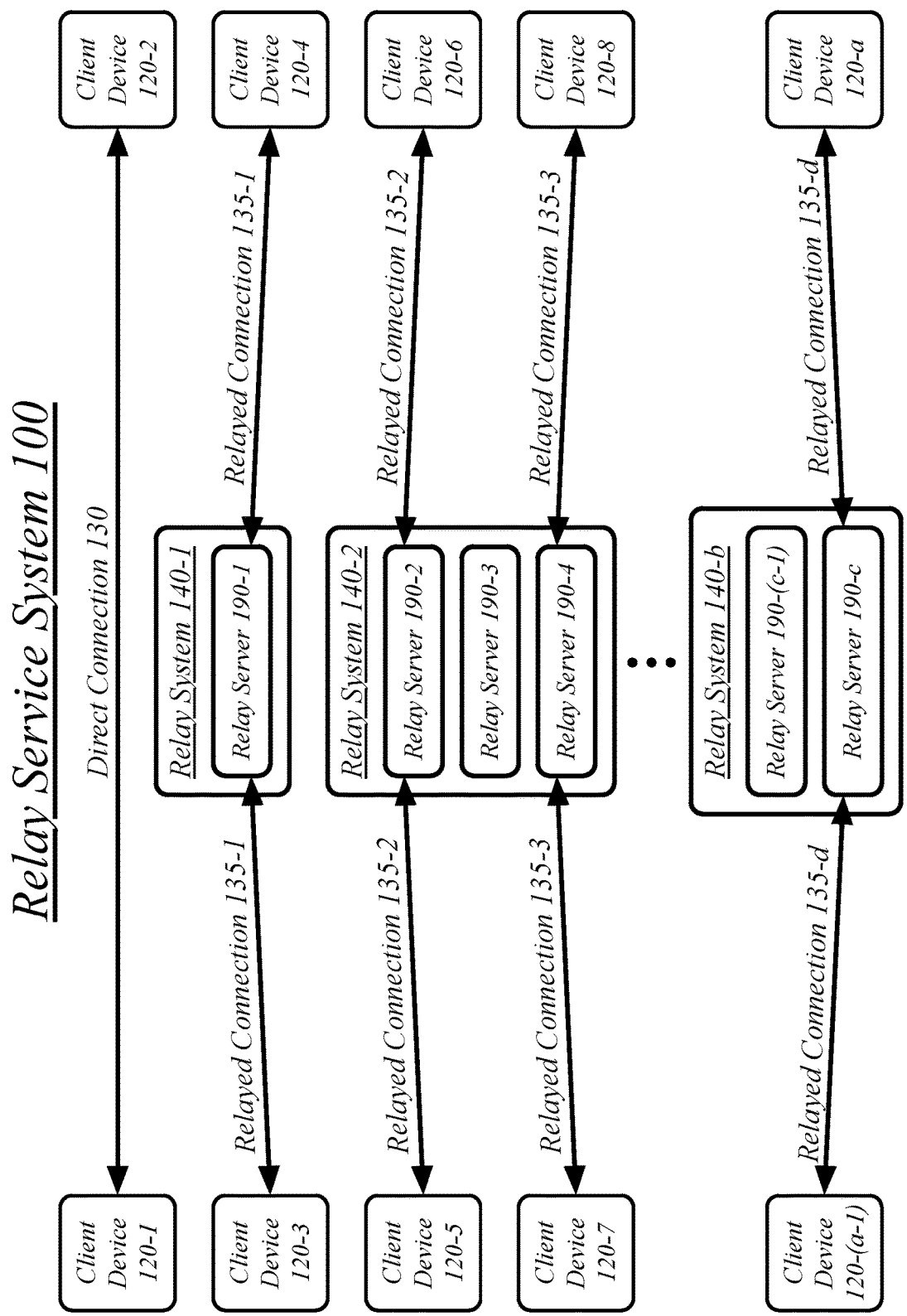
FIG. 1 illustrates an embodiment of a relay system.

A client-server system may use a distributed server systems to provide service to clients. A client-server system may be arranged as a two-tier distributed server system in which client communication is initially received by a plurality of load balancers and from there distributed among a plurality of servers. The load balancers may distribute client access using randomization techniques, such as a consistent hashing scheme, so as to distribute the client load evenly without explicit coordination between the load balancers.

Where the servers simply serve individual clients the clients may be randomly distributed without complication. However, some network services may involve communication in which a central server acts as an intermediary between two or more client devices: voice-over-internet-protocol (VoIP), online gaming, or other multiparty communication. For these services, transmissions from one client device may be forward to one or more other client devices. However, when using a pseudo-random selection of a server from the load balancers, most pairs of client devices will not be forwarded to the same server. As such, the servers are aided by techniques for coordinating the handling of received client communication. As a result, the embodiments can improve the scalability and modularity of two-tier communications services.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a relay service system 100. In one embodiment, the relay service system 100 may comprise a computer-implemented system having software applications comprising one or more components. Although the relay service system 100 shown in FIG. 1 has a limited number of elements in a certain topology, it may be appreciated that the relay service system 100 may include more or less elements in alternate topologies as desired for a given implementation.

A communications system may be generally arranged to enable communication. For instance, a communication systems may receive, store, and deliver messages. A communications system may act as any sort of communications intermediary, such as for messaging, VoIP, online gaming, or other intermediated online interaction between multiple client devices. A communications system may store messages while communications applications, such as may execute on client devices 120 are offline and deliver the messages once the communications applications are available. A communications system may empower the engagement and performance of other communication tasks, such as audio and/or video calls.

A plurality of client devices 120 may operate as part of the relay service system 100, transmitting messages and otherwise communicating between each other as part of a communications system. The client devices 120 may execute communications applications for the communications system, wherein each of the client devices 120 and their respective communications applications are associated with a particular user of the communications system. In some embodiments, the client devices 120 may be cellular devices such as smartphones and may be identified to the communications system based on a phone number associated with each of the client devices 120. In some embodiments, the client devices 120 may be identified to the communications system based on a user account registered with the communications system—and potentially a social networking system that comprises or is associated with the communications system—and logged into from the communications application executing on the client devices 120. In general, each communications application may be addressed through various techniques for the reception of messages. While in some embodiments the client devices 120 may comprise cellular devices, in other embodiments one or more of the client devices 120 may include personal computers, tablet devices, any other form of computing device without limitation. Personal computers and other devices may access a communications system using web browser accessing a web server, for instance.

Streaming network connections within the communications system may be performed directly or via relay systems 140. A direct streaming network connection may correspond to a connection in which the outgoing network packets from one client device are addressed to either the destination client device or to a device directly masquerading as the destination client device, such as where a national address translation (NAT) device is used. NAT may be performed by, for example, routers used in the providing of home, business, or other local networks. A relayed streaming network connection may correspond to a connection in which the outgoing network packets from one client device are addressed to a relay system provided as part of the communications system, the relay system then forwarding the network packets to the destination client device. Relay systems 140 may be used, for instance, to bridge NAT devices that are not configured to sufficiently expose a destination client device for the performance of a direct connection. In some embodiments, a relay system may comprise a single relay server, with the relay server and the relay system being equivalent. In other embodiments, a relay system may comprise a plurality of relay servers, with the relaying tasks of the relay system distributed among the relay servers, such as where a given client device or set of client devices interoperating with each other are assigned a particular relay server of a plurality of relay servers 190.

The client devices 120 may communicate using wireless transmissions to exchange network traffic. Exchanging network traffic, such as may be included in the exchange of messaging transactions, may comprise transmitting and receiving network traffic via a network interface controller (NIC). A NIC comprises a hardware component connecting a computer device, such as each of client devices 120, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller may be used for the network activities of the embodiments described herein.

Relay service system 100 may include an authorization server (or other suitable component(s)) that allows users to opt in to or opt out of having their actions logged by relay service system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of relay service system 100 and other elements of a messaging system through blocking, data hashing, anonymization, or other suitable techniques as appropriate. For instance, a user may be empowered to configure privacy settings determining whether network performance information is logged by the relay service system 100 and analyzed. In some embodiments, a user may be presented with information regarding may be collected and how that information may be used, such as informing the user that collected information may be anonymized prior to analysis.

Figure 2:
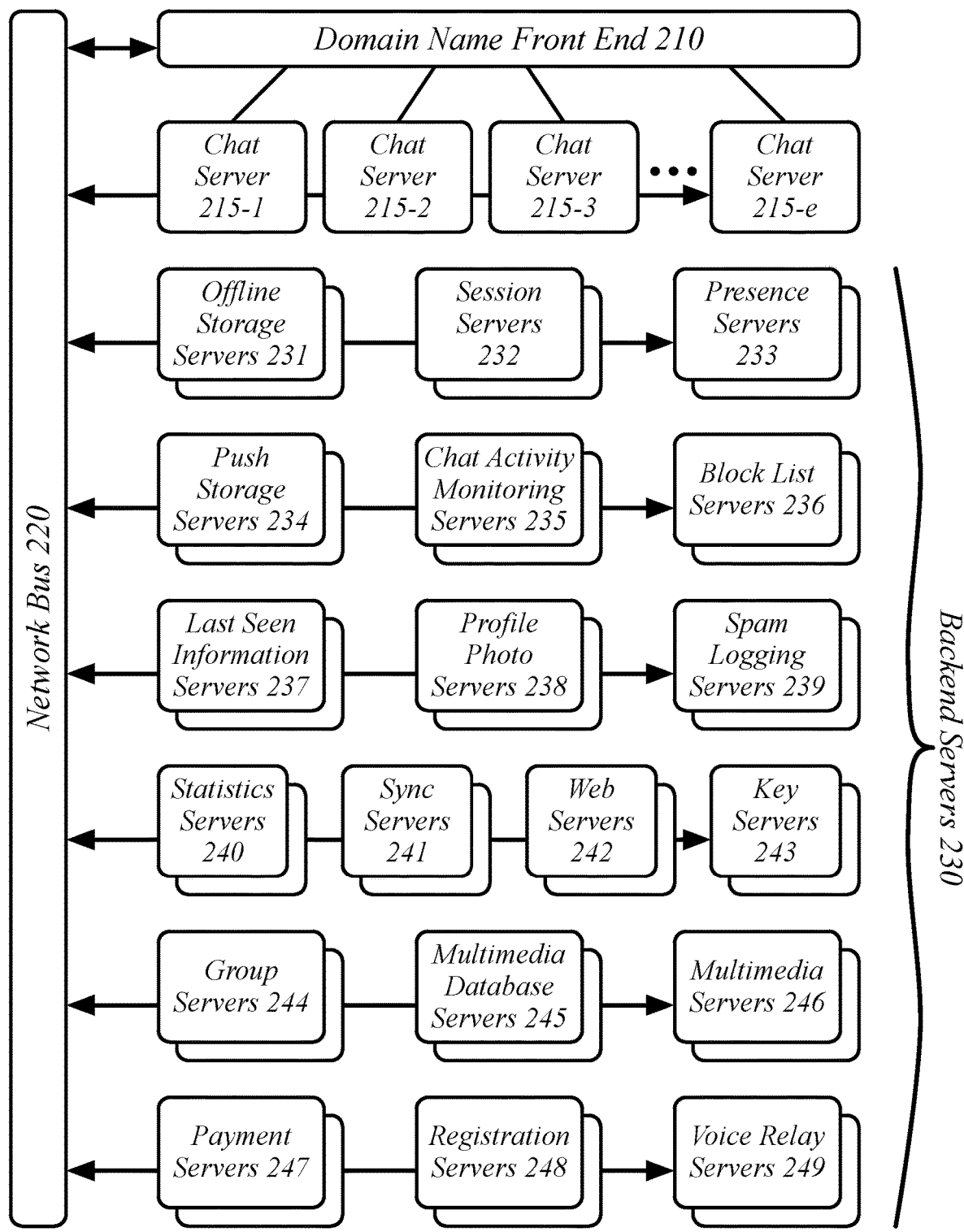
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the relay service system 100 with the operations of the relay service system 100 comprising a portion of the overall operations of the messaging system 200. The illustrated embodiment of the messaging system 200 may particularly correspond to a portion of the communications system described with reference to FIG. 1 comprising one or more server devices providing messaging services to the user of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing. Where a user engages in a VoIP interaction, a chat server may act as a relay initiation system to authorize access to the voice relay servers 249 and to provide information to the client devices for the selection of a particular relay system within the plurality of voice relay servers 249.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls. The one or more voice relay servers 249 may comprise a plurality of relay systems, such as may be geographically distributed into different geographic service areas.

Figure 3:
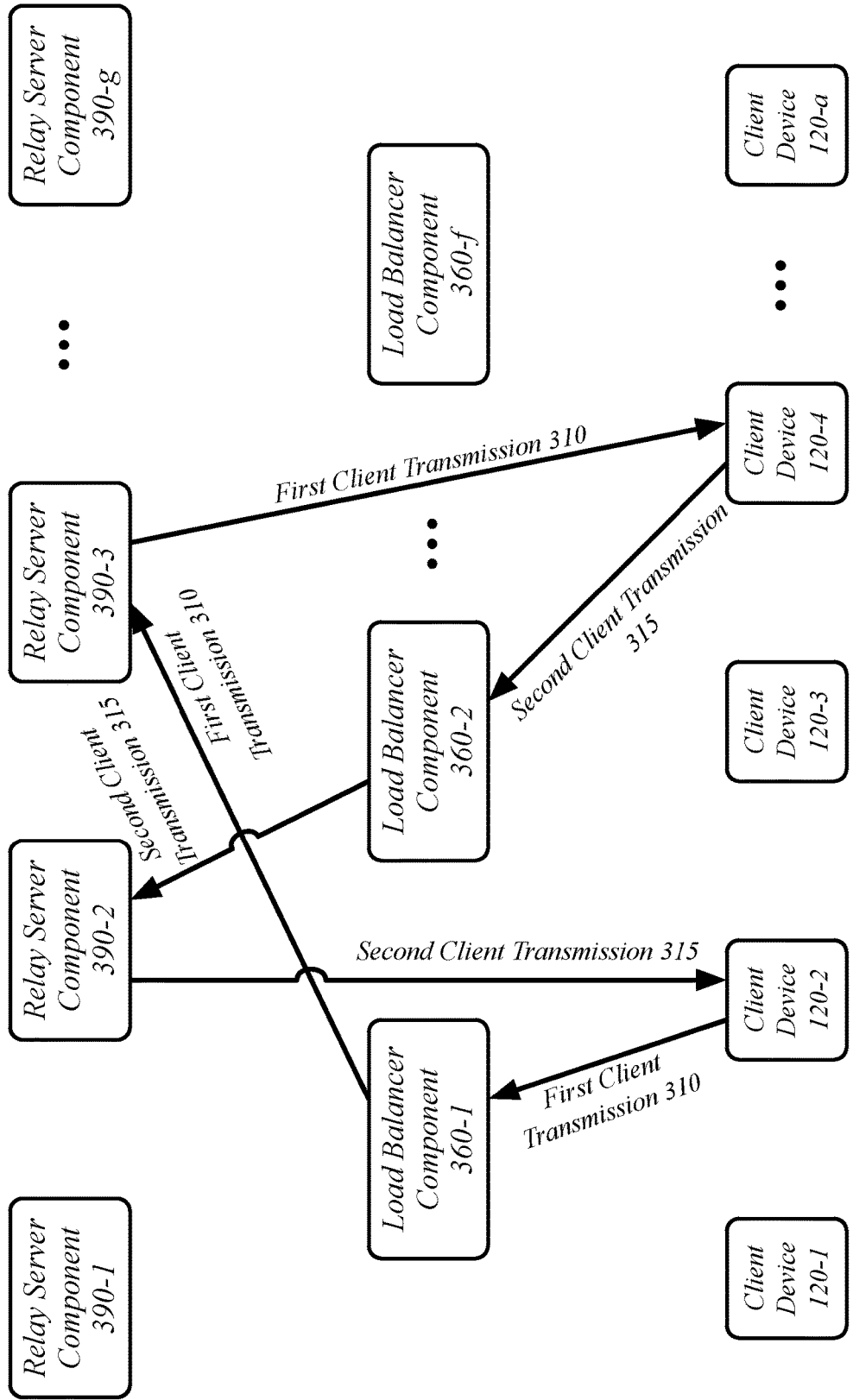
FIG. 3 illustrates an embodiment of a load-balanced relay system performing a two-way relay operation.

FIG. 3 illustrates an embodiment of a load-balanced relay service system 100 performing a two-way relay operation.

A relay service system 100 may service a plurality of client devices 120. The relay service system 100 may comprise a plurality of load balancer components 360 and a plurality of relay server components 390. The plurality of load balancer components 360 and plurality of relay server components 390 may together comprise a particular relay system of the plurality of relay systems 140. The plurality of relay server components 390 may generally correspond to the relay servers for a particular relay system.

A load balancer component 360-1 may receive a first client transmission 310 from a client device 120-2, the first client transmission 310 for delivery to another client device 120-4. The load balancer component 360-1 may determine a relay server component 390-3 to forward the first client transmission 310 to based on a network address (e.g., an internet protocol (IP) address) for the client device 120-2. The load balancer component 360-1 may be determined based on a consistent hashing scheme using known consistent hashing techniques. The load balancer components 360 may operate without client state to provide for faster performance.

A relay server component 390-3 receiving a first client transmission 310 may forward the first client transmission 310 to the client device 120-4 to which transmissions from the originating client device 120-2 is being relayed. The relay server component 390-3 may transmit directly to the client device 120-4 bypassing the load balancer components 360 on outgoing transmissions.

Similarly, a load balancer component 360-2 may receive a second client transmission 315 from a different client device 120-4, the second client transmission 315 for delivery to the client device 120-2 engaged in relaying with the different client device 120-4. The load balancer component 360-2 may determine a relay server component 390-2 to forward the second client transmission 315 to based on a network address (e.g., an IP address) for this client device 120-4. The load balancer component 360-2 may be determined based on a consistent hashing scheme using known consistent hashing techniques.

The relay server component 390-2 receiving a second client transmission 315 may similarly forward the second client transmission 315 to the first client device 120-2 to which transmissions from the other client device 120-4 is being relayed. The relay server component 390-2 may transmit directly to the client device 120-2 bypassing the load balancer components 360 on outgoing transmissions.

As such, a two-way relaying may be constructed with the relay services being distributed across relay server components 390 by load balancer components 360 using consistent hashing without explicit coordination between the load balancer components 360 so as to avoid per-client state on the load balancer components 360. Despite the relaying between two client devices being handled by two different relay server components, each client device may receive the sent transmissions of the other client device. The enclosed embodiments may be used to coordinate the operations of the relay server components 390, such as communicating between relay server components the address information for client devices being relayed between.

The particular load balancer which receives a client transmission may be determined by one or more edge routers for the particular relay system comprising the load balancer components 360 and the relay server components 390. Various techniques may be used by the edge router(s) to determine the load balancer component to receive client transmissions, such as randomization techniques. Edge routers may operate without client state to provide for faster performance. The edge routers may not be restricted to using consistent forwarding of transmissions from particular client devices to particular load balancers due to the load balancer components 360 being equally able to apply the consistent hashing scheme to each transmission to determine the relay server to receive the transmissions for relay. As such, the failure or taking offline of any given load balancer may be handled without modification of the techniques of the edge router, with the edge router simply excluding any offline load balancer, such as may be determined according to heartbeat techniques applied to the load balancer components 360.

Figure 4:
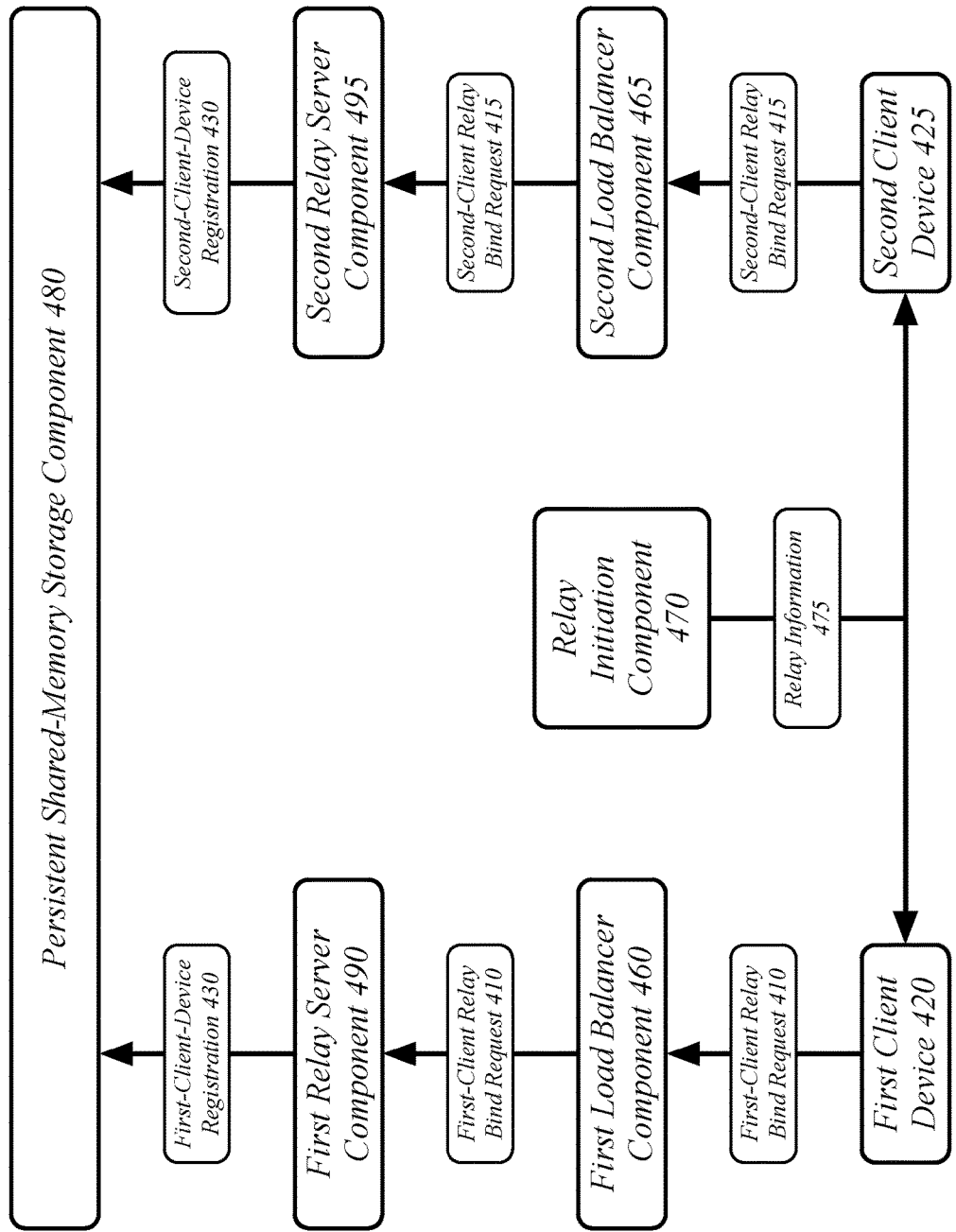
FIG. 4 illustrates an embodiment of client binding in a relay system.

FIG. 4 illustrates an embodiment of client binding in a relay service system 100.

A pair of client devices 420, 425 may request relay service from a relay service system 100 using a relay initiation component 470. A relay service system 100 may include a relay initiation component 470 generally arranged to empower a client device to engage in relay activity using the relay service system 100. A relay initiation component 470 may also serve additional functions in a relay service system 100. For instance, where the relay service system 100 is a component of a messaging system 200, the relay initiation component 470 may correspond to a chat server, wherein each of the plurality of chat servers 215 is operative to initiate a process for client devices in engaging in relay services, such as a VoIP call.

The relay initiation component 470 may provide relay information 475 to both of the client devices 420, 425. Relay information 475 may comprise address information for a relay system comprising the load balancer components 460, 465 and relay server components 490, 495. In some cases, relay information 475 may comprise address information for a plurality of relay systems with the client devices 420, 425 selecting a particular relay system based testing their network performance to the relay systems and selecting the system with the best combined network performance.

The relay information 475 may include a token authenticating the client devices 420, 425 to use the relay system. A token may be encrypted according to an encryption key kept as secret information by the relay service system 100 such that the encrypted token comprises an encrypted signature verifying to the relay system that the client devices 420, 425 were authenticated by the relay initiation component 470 to use the relay system. The token, once decrypted using the encryption key used to encrypt the token or using a matching key where a key pair is used, may include information to verify the client devices 420, 425 being authorized to use the relay system, such as by including identifying information for the client devices 420, 425 and a timestamp for the generation of a token, such as may be used to limit the time period in which a client device is authorized to use the relay system based on the token. The relay information 475 may include a session identifier assigned to the relay session to be created between the client devices 420, 425.

The first load balancer component 460 may receive a first-client relay bind request 410 from the first client device 420. The first client device 420 may be associated with a first network address, such as the network address from which the first client device 420 is transmitting and that is in the header for network transmissions from the first client device 420. It will be appreciated that in some cases the network address associated with a client device may be associated with the client device due to the client device being behind a network address translation (NAT) device, such as a router, firewall, or other network device. The first relay bind request 410 may also be associated with a first client device identifier for the first client device 420. In some embodiments, the first client device identifier may be the first network address for the first client device 420.

The first load balancer component 460 may determine a first relay server component 490 based on the first client device identifier by applying a hashing function to the first client device identifier and forward the first-client relay bind request 410 to the first relay server component 490. The hashing function may be a consistent hashing function used by all of the load balancer components for a relay system so as to produce consistent hashing results across all the load balancers.

The first relay server component 490 may receive the first-client relay bind request 410 from the first load balancer component 460. The first relay server component 490 may extract a session identifier from the first-client relay bind request 410 and register the first client device 420 in association with the session identifier in a persistent shared-memory storage component 480. A persistent shared-memory storage component 480 may comprise an indexed repository of information available for storage and retrieval for a plurality of components, such as the relay server components 490. Data may be stored in the persistent shared-memory storage component 480 with an index and retrieved by performing a retrieval based on the index. The session identifier, such as may be generated by the relay initiation component 470 and indicated in the relay information 475 incorporated into a relay bind request 410, 415, may be used as the index for storage and retrieval of information for the relay session in the persistent shared-memory storage component 480. The persistent shared-memory storage component 480 may therefore be used to coordinate the operations of the relay server components 490, 495 by using the session identifier as an index.

The second load balancer component 465 may receive a second-client relay bind request 415 from a second client device 425, the second-client relay bind request 415 associated with a second client device identifier for the second client device. As with the first client device identifier, the second client device identifier may comprise the second network address for the second client device 425. The second load balancer component 465 may determine a second relay server component based on the second client device identifier by applying the hashing function to the second client device identifier. The second load balancer component 465 may forward the second-client relay bind request to the second relay server component 465.

The second relay server component 495 may receive the second-client relay bind request 415 from the second load balancer component 465. The second relay server component 495 may extract a session identifier from the second-client relay bind request 415, the session identifier extracted from the second-client relay bind request 415 may be the same session identifier extracted from the first-client relay bind request 410, with this identity of the session identifiers used to coordinate the exchange of information between the relay server components 490, 495. The second relay server component 495 may register the second network address for the second client device 425 in association with the session identifier in the persistent shared-memory storage component 480.

The relay bind requests 410, 415 may contain relay information 475 that includes an encrypted token and a key index used to specify the encryption key used to encrypt and decrypt the token. The relay service system 100 may maintain an encryption key table distributed among the various relay systems 140, wherein the encryption key table comprises a plurality of encryption keys with each of the plurality of encryption keys identified by a key index. The encryption key table may be used to periodically rotate encryption keys for the relay service system 100.

The relay service system 100 may periodically rotate through encryption keys so that if an encryption key is uncompromised only a limited portion of communication within the relay service system 100 covering a limited period of time. However, as the relay service system 100 may be distributed across multiple relay systems, the careful coordination of the distribution and changing of encryption keys may be performed to avoid the use of encryption keys by one element of the relay service system 100 without those encryption keys having been distributed to all elements of the relay service system 100 rendering those other elements unable to decrypt the internal communication.

As such, the relay service system 100 may maintain the encryption key table with multiple encryption keys stored within. The relay service system 100 may use a particular encryption key at a particular key index for the encryption of internal communication, including the encryption of encrypted tokens. The relay service system 100 may update one or more of the other keys in the encryption key table, at different index(s) than the currently-used key index, while those key index(s) are not being used so that any temporary mismatch in the keys stored at a particular key index between different elements (e.g., different relay systems) of the relay service system 100 does not result in non-decrypt-able communication between the elements due to the keys at those index(s) not being used during the period of time allowed for the distribution of the updated keys. Once the distribution of the updated keys has been performed and verified those updated keys are then available for use without the risk of non-decrypt-able communication. As such, the use of an encryption key table may empower the periodic updating of encryption keys while avoiding the risk of elements of the relay service system 100 being mutually unintelligible.

The relay initiation component 470 may receive a key rotation command, the key rotation command specifying the key index for use in encrypting tokens, the key index replacing a previous key index used for encrypting tokens. The relay initiation component 470 may then use this key index for any future distribution of encrypted tokens until such time that an additional key rotation command is received. The relay initiation component 470 may receive a key replacement command, the key replacement command specifying a replacement key for the encryption key table at the previous key index. In response to the key replacement command, the relay initiation component 470 may store the replacement key at the previous key index in the encryption key table. The relay service system 100 may thereby transition from using the previous key index to the current key index and then update the encryption key in the encryption key table at the previous key index, so that the updated encryption key in the encryption key table at the previous key table is available for eventual use during a future key rotation. The relay initiation component 470 may use an encryption key from the encryption key table to encrypt the token used to communicate relay information 475 from the relay initiation component 470 to the relay server components 490, 495.

The relay initiation component 470 may receive a relay system request for the first client device 420 and the second client device 425. The relay initiation component 470 may generate an unencrypted token, the unencrypted token comprising the session identifier. The relay initiation component 470 may generate the encrypted token by encrypting the unencrypted token using the encryption key. The relay initiation component 470 may augment the encrypted token with the key index. The key index may be transmitted to the clients as a component of the relay information 475 and included in the relay bind requests 410, 415 in an unencrypted form to empower to the relay server components 490 to determine the particular encryption key from the encryption key table used to encrypt and that may be used to decrypt the encrypted token. The relay initiation component 470 may transmit the encrypted token to the first client device 420 and transmit the encrypted token to the second client device 425, the encrypted token transmitted to the client devices 420, 425 augmented with the key index in an unencrypted form.

The first relay server component 490 may extract the key index from the first-client relay bind request 410 and extract the encrypted token from the first-client relay bind request 410. The first relay server component 490 may retrieve the encryption key from the encryption key table based on the key index. The first relay server component 490 may generate an unencrypted token by decrypting the encrypted token using the encryption key. The first relay server component 490 may extract the session identifier from the first-client relay bind request 410 by extracting the session identifier from the unencrypted token. The first relay server component 490 may then use the session identifier for the indexing of information stored in the persistent shared-memory storage component 480 for coordination with the second relay service component 495.

Similarly, the second relay server component 495 may extract the key index from the second-client relay bind request 415 and extract the encrypted token from the second-client relay bind request 415. The second relay server component 495 may retrieve the encryption key from the encryption key table based on the key index. The second relay server component 495 may generate an unencrypted token by decrypting the encrypted token using the encryption key. The second relay server component 495 may extract the session identifier from the second-client relay bind request 415 by extracting the session identifier from the unencrypted token. The second relay server component 495 may then use the session identifier for the indexing of information stored in the persistent shared-memory storage component 480 for coordination with the first relay service component 490.

In some cases, the relay service system 100 may deny particular relay systems of the plurality of relay systems 140 some of the encryption keys from the encryption key table and/or may generate additional encryption keys at distinct key index(s) for these particular relay systems. For example, different relay systems may face different risks of having their security compromised and their encryption keys exposed. Relay systems identified as facing a particular risk of having their security compromised may be partially quarantined by denying them access to the encryption keys used by other relay systems and assigned their own encryption keys. Any encrypted token transmitted for use with these relay systems may exclusively use the encryption keys specifically associated with those relay systems. Those relay systems may be transmitted an encryption key table with null entries in a general shared portion of the encryption key table and with filled entries in a region-specific portion of the encryption key table. In some embodiments, each relay system assigned region-specific encryption keys may be assigned its own region-specific portion of the encryption key table.

A relay server pool corresponding to a particular relay system may comprise the first load balancer component 460 and the second load balancer component 465, such as may be among other load balancer components. The relay server pool may comprise the first relay server component 490 and the second relay server component 495, such as may be among other relay server components. The relay server pool may be associated with a geographic service area, wherein the encryption key table for the geographic service area comprises null entries, such as in a non-region-specific portion of the encryption key table. The relay initiation component 470 may select the key index to avoid the null entries based on the relay server pool being associated with the geographic service area.

Figure 5:
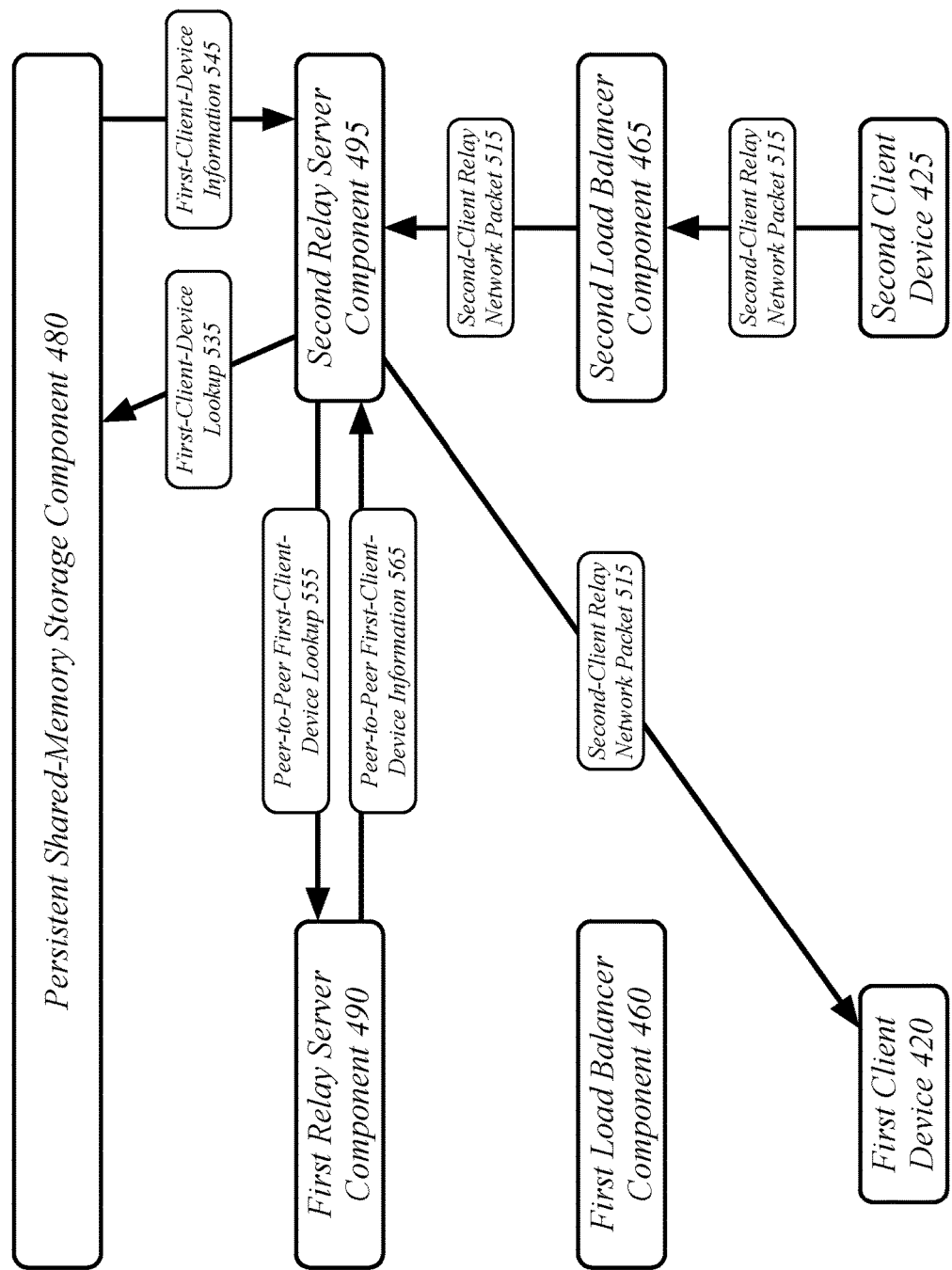
FIG. 5 illustrates an embodiment of a first-client-device lookup in a relay system.

FIG. 5 illustrates an embodiment of a first-client-device lookup 535 in a relay service system 100.

The second relay server component 495 may use the session identifier to retrieve the network addressing information for the first client device 420. The second relay server component 495 may receive the second-client relay bind request 415 from the second load balancer component 465 and extract the session identifier from the second-client relay bind request 415. The second relay server component 495 may access the persistent shared-memory storage component 480 based on the session identifier in a first-client-device lookup 535, such as by using the session identifier as an index. The second relay server component 495 may retrieve the first network address for the first client device 420 based on accessing the persistent shared-memory storage component 480 based on the session identifier and associate the first network address as a relay destination for the second client device 425. The second relay server component 495 may use an association between the network address for the second client device 425 and the network address for the first client device 420 in order to avoid a requirement that the session identifier be included in every second-client relay network packet so as to save space in the second-client relay network packets, using the session identifier only for the bind request and not for network packets requested for relaying.

The second relay server component 495 may retrieve first-client-device information 545 from the persistent shared-memory storage component 480. In some embodiments, retrieving the first network address based on accessing the persistent shared-memory storage component 480 based on the session identifier comprises retrieving the first network address from the persistent shared-memory storage component 480 based on the session identifier. In these embodiments, the first-client-device information 545 may comprise the first network address. In other embodiments, retrieving the first network address based on accessing the persistent shared-memory storage component 480 based on the session identifier may comprise retrieving a first relay server component identifier for the first relay server component 490 from the persistent shared-memory storage component 480 and retrieving the first network address from the first relay server component 490. In these embodiments, the first-client-device information 545 may comprise the first relay server component identifier. The second relay server component 495 may transmit a peer-to-peer first-client-device lookup 555 to the first relay server component 490 using the first relay server component identifier and receive peer-to-peer first-client-device information 565 in response, the peer-to-peer first-client-device information 565 comprising the first network address.

The second load balancer component 465 may receive a second-client relay network packet 515 from the second client device 425, the second-client relay network packet 515 associated with the second client device identifier for the second client device. In some embodiments, the second-client relay network packet 515 may be associated with the second client device identifier based on the second client device identifier being the network address for the second client device 425, with the second-client relay network packet 515 received from the network address.

The second load balancer component 465 may determine the second relay server component 495 based on the second client device identifier by applying the hashing function to the second client device identifier. This may be the same process used—the application of the same consistent hashing function—as for the forwarding of the second-client relay bind request 415 from the second load balancer component 465 to the second relay server component 495. The second load balancer component 465 may then forward the second-client relay network packet to the second relay server component 495.

The second relay server component 495 may receive the second-client relay network packet 515 from the second load balancer component 465. The second relay server component 495 may identify the second client device 425 based on the second network address. Given the association for the second client device 425 by the second relay server component 495 of the first network address as a relay destination for the second client device 425, the second relay server component 495 may transmit the second-client relay network packet 515 to the first client device 420 based on the first network address in response to identifying the second client device 425 based on the second network address.

Figure 6:
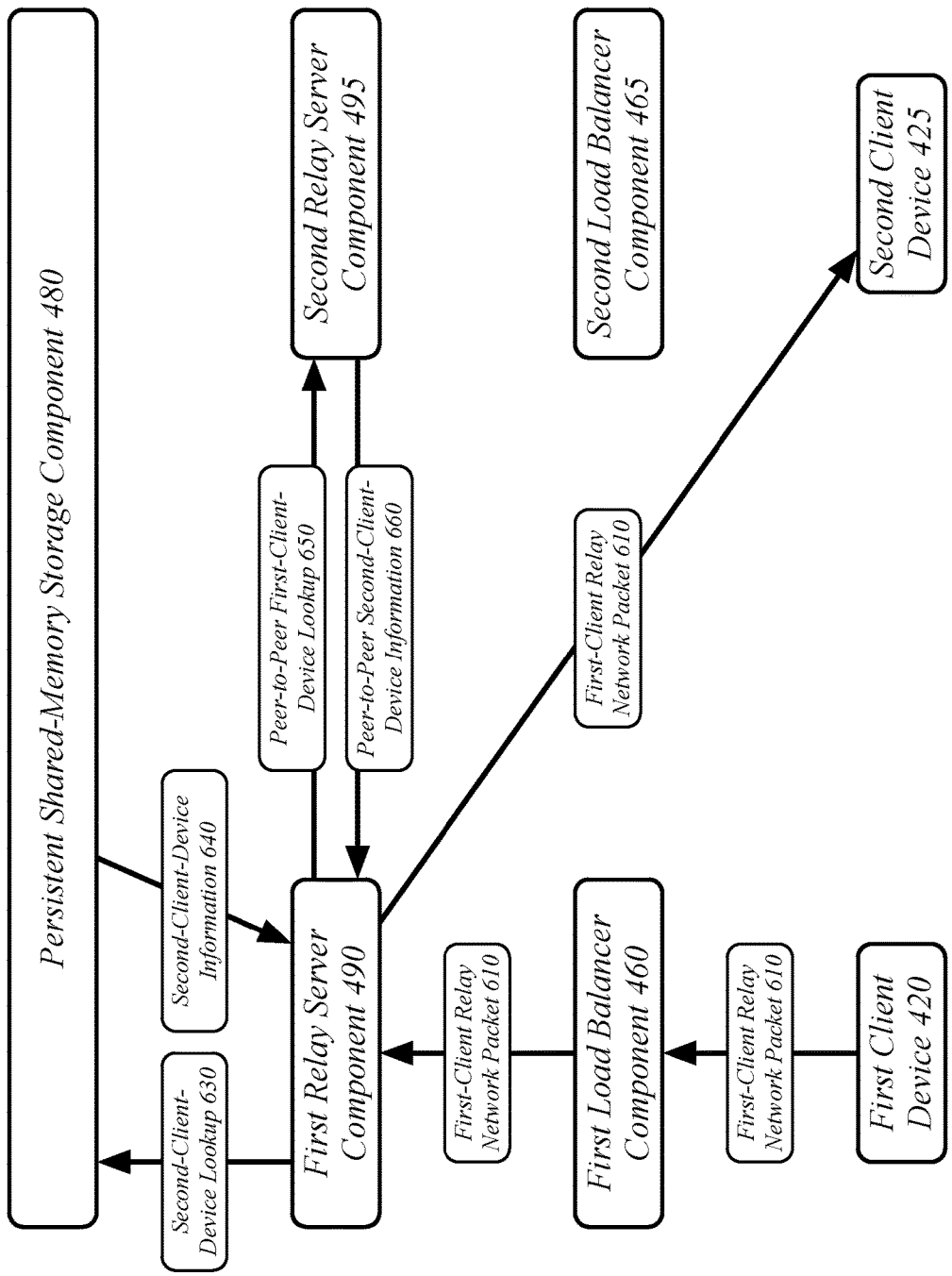
FIG. 6 illustrates an embodiment of a second-client-device lookup in a relay system.

FIG. 6 illustrates an embodiment of a second-client-device lookup 630 in a relay service system 100. The process for the second-client-device lookup 630 by the first relay server 490 may be substantially similar to the process for the first-client-device lookup 535 by the second relay server 495.

The first load balancer component 460 may receive a first-client relay network packet 610 from the first client device 420, the first-client relay network packet 610 associated with the first client device identifier for the first client device 420. This first client device identifier may be the network address of the first client device 420. The first load balancer component 460 may determine the first relay server component 490 as the relay component to handle the first client device 420 based on the first client device identifier by applying the hashing function to the first client device identifier and forward the first-client relay network packet 610 to the first relay server component 490.

The first relay server component 490 may receive the first-client relay network packet 610 from the first load balancer component 460. The first relay server component 490 may identify the first client device 420 based on the first network address and transmit the first-client relay network packet 610 to the second client device 425 based on the second network address in response to identifying the first client device 420 based on the first network address.

The first relay server component 490 may use the session identifier to retrieve the network addressing information for the second client device 425. The first relay server component 490 may receive the first-client relay bind request 410 from the first load balancer component 460 and extract the session identifier from the first-client relay bind request 410. The first relay server component 490 may access the persistent shared-memory storage component 480 based on the session identifier in a second-client-device lookup 630, such as by using the session identifier as an index. The first relay server component 490 may retrieve the first network address for the second client device 425 based on accessing the persistent shared-memory storage component 480 based on the session identifier and associate the second network address as a relay destination for the first client device 420. The first relay server component 490 may use an association between the network address for the first client device 420 and the network address for the second client device 425 in order to avoid a requirement that the session identifier be included in every first-client relay network packet so as to save space in the first-client relay network packets, using the session identifier only for the bind request and not for network packets requested for relaying.

The first relay server component 490 may retrieve second-client-device information 640 from the persistent shared-memory storage component 480. In some embodiments, retrieving the second network address based on accessing the persistent shared-memory storage component 480 based on the session identifier comprises retrieving the second network address from the persistent shared-memory storage component 480 based on the session identifier. In these embodiments, the second-client-device information 640 may comprise the second network address. In other embodiments, retrieving the second network address based on accessing the persistent shared-memory storage component 480 based on the session identifier may comprise retrieving a second relay server component identifier for the second relay server component 495 from the persistent shared-memory storage component 480 and retrieving the second network address from the second relay server component 495. In these embodiments, the second-client-device information 640 may comprise the second relay server component identifier. The first relay server component 490 may transmit a peer-to-peer first-client-device lookup 650 to the second relay server component 495 using the second relay server component identifier and receive peer-to-peer second-client-device information 660 in response, the peer-to-peer second-client-device information 660 comprising the second network address.

The relay service system 100 may be operative to recover from the failure of a relay server component by retrieving addressing information from the persistent shared-memory storage component 480. Where a relay server component is taken offline, either intentionally or due to the result of a failure, the load balancers may detect the relay server component being offline due to the lapse in response to a heartbeat monitoring of the relay server components. The load balancers may then exclude the offline relay server component as a destination for received communications, whether bind requests or network packets. A different relay server would therefore be selected by the hashing scheme for network packets. This relay server may retrieve the appropriate address forwarding information either directly from the persistent shared-memory storage component 480 or peer-to-peer from a still-operating relay server component in a process the same as described with regards to the initial binding of client devices to relay servers. In some embodiments, a client device may be requested to re-bind to the relay server component taking over for the relaying for a client device in order for the relay server component to receive the session identifier to perform a lookup in the persistent shared-memory storage component 480. In other embodiments, the relay server components may store in the persistent shared-memory storage component 480 the network address to which network packets should be relayed indexed by the network address from which the network packets would arrive.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 7A, 7B illustrates one embodiment of a logic flow 700. The logic flow 700 may be representative of some or all of the operations executed by one or more embodiments described herein.

In the illustrated embodiment shown in FIG. 7, the logic flow 700 may receive a first-client relay bind request from a first load balancer component at a first relay server component, the first-client relay bind request forwarded from the first load balancer component after reception from a first client device, the first client device associated with a first network address, the first relay bind request associated with a first client device identifier for the first client device at block 702.

The logic flow 700 may extract a session identifier from the first-client relay bind request by the first relay server component at block 704.

The logic flow 700 may register the first client device in association with the session identifier in a persistent shared-memory storage component by the first relay server component at block 706.

The logic flow 700 may receive a second-client relay bind request from a second load balancer component at a second relay server component, the second-client relay bind request forwarded from the second load balancer component after reception from a second client device, the second-client relay network packet associated with a second client device identifier for the second client device at block 708.

The logic flow 700 may extract the session identifier from the second-client relay bind request at block 710.

The logic flow 700 may access the persistent shared-memory storage component based on the session identifier at block 712.

The logic flow 700 may retrieve the first network address based on accessing the persistent shared-memory storage component based on the session identifier at block 714.

The logic flow 700 may associate the first network address as a relay destination for the second client device at block 716.

The logic flow 700 may receive a second-client relay network packet from the second load balancer component, the second-client relay network packet forwarded from the second load balancer component after reception from the second client device at block 718.

The logic flow 700 may identify the second client device based on the second network address at block 720.

The logic flow 700 may transmit the second-client relay network packet to the first client device based on the first network address in response to identifying the second client device based on the second network address at block 722. The embodiments are not limited to this example.

Figure 8:
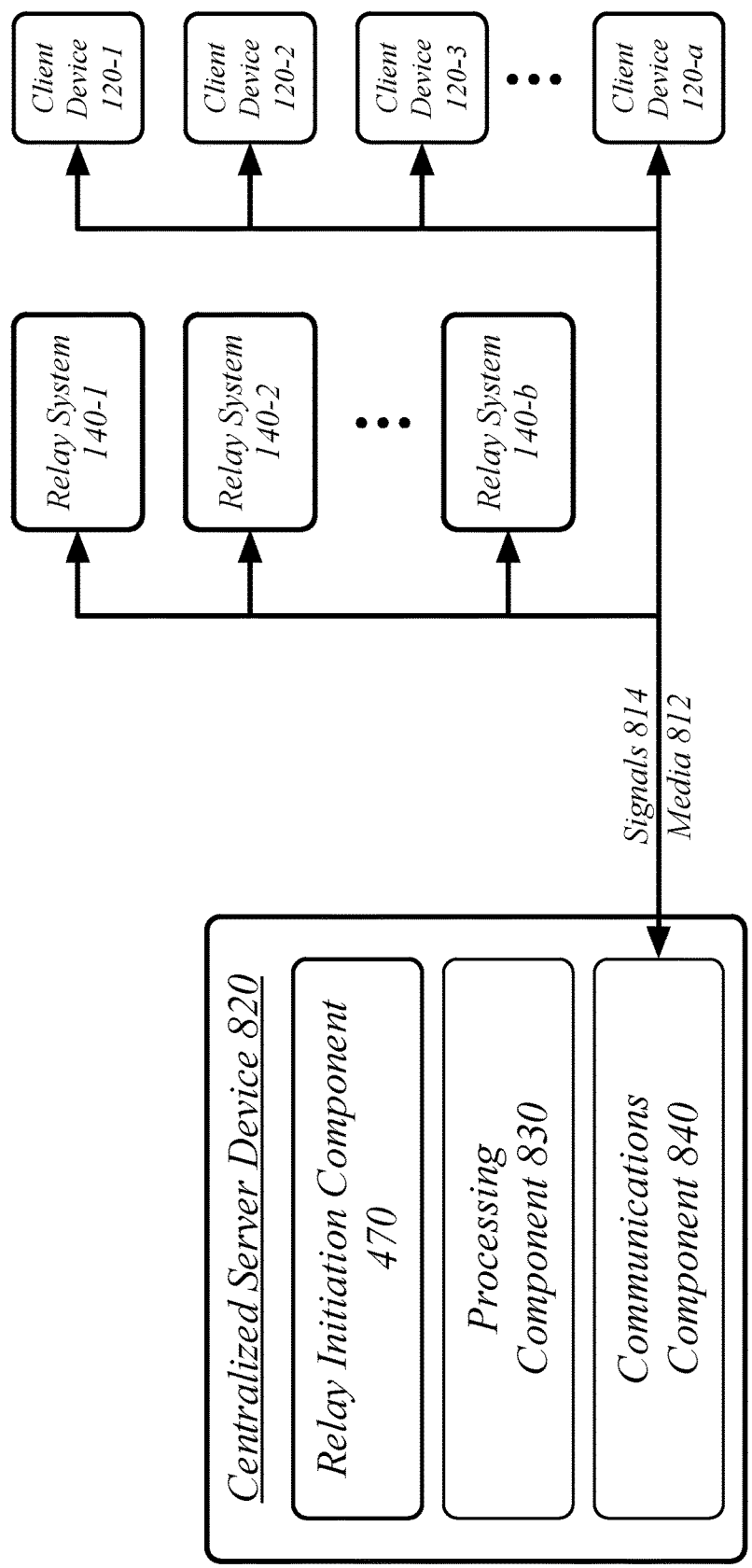
FIG. 8 illustrates an embodiment of a centralized system for the system of FIG. 1.

FIG. 8 illustrates a block diagram of a centralized system 800. The centralized system 800 may implement some or all of the structure and/or operations for the system 100 in a single computing entity, such as entirely within a single centralized server device 820.

The centralized server device 820 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 820 may execute processing operations or logic for the system 100 using a processing component 830. The processing component 830 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 820 may execute communications operations or logic for the system 100 using communications component 840. The communications component 840 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 840 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 812 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 820 may communicate with other devices over a communications media 812 using communications signals 814 via the communications component 840. The devices may be internal or external to the centralized server device 820 as desired for a given implementation. The centralized server device 820 may execute the relay initiation component 470. The centralized server device 820 may communicate with the relay systems 140 and the client devices 120 using the signals 814 transmitted over the media 812.

Figure 9:
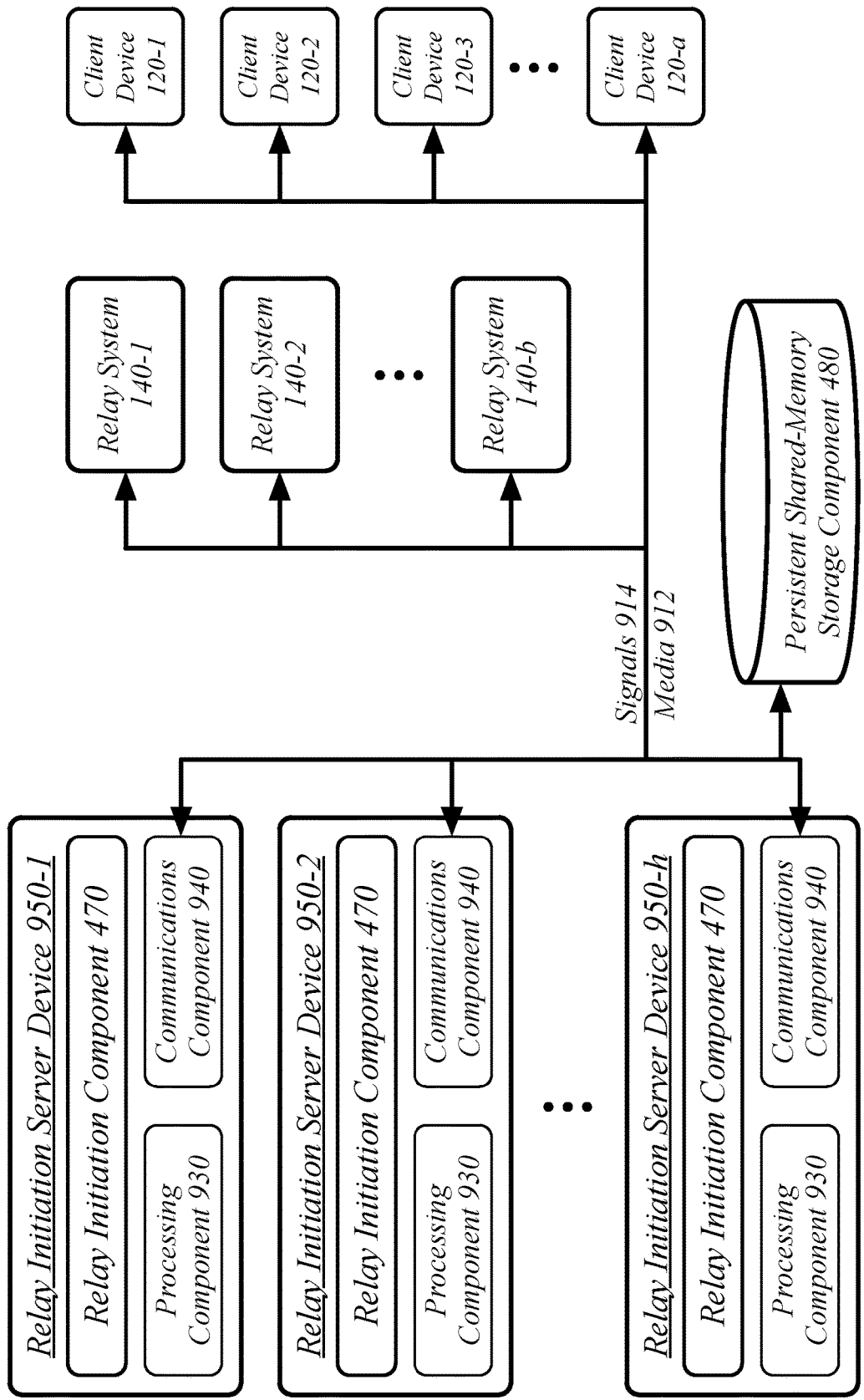
FIG. 9 illustrates an embodiment of a distributed system for the system of FIG. 1.

FIG. 9 illustrates a block diagram of a distributed system 900. The distributed system 900 may distribute portions of the structure and/or operations for the system 100 across multiple computing entities. Examples of distributed system 900 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 900 may comprise a plurality of relay initiation server devices 950. In general, the server devices 950 may be the same or similar to the centralized server device 820 as described with reference to FIG. 8. For instance, the server devices 950 may each comprise a processing component 930 and a communications component 940 which are the same or similar to the processing component 830 and the communications component 840, respectively, as described with reference to FIG. 8. In another example, the server devices 950 may communicate over a communications media 912 using communications signals 914 via the communications components 940.

The relay initiation server devices 950 may comprise or employ one or more programs that operate to perform various methodologies in accordance with the described embodiments. In one embodiments, for example, the relay initiation server devices 950 may each execute a relay initiation component 470.

The relay systems 140 may similarly be arranged as distributed systems. The relay systems 140 may each comprise a distributed system. Examples of these distributed systems may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context. Each of the server devices in a distributed system within each relay system of the plurality of relay system 140 may comprise server devices substantially similar to the centralized server device 820 described with reference to FIG. 8.

Figure 10:
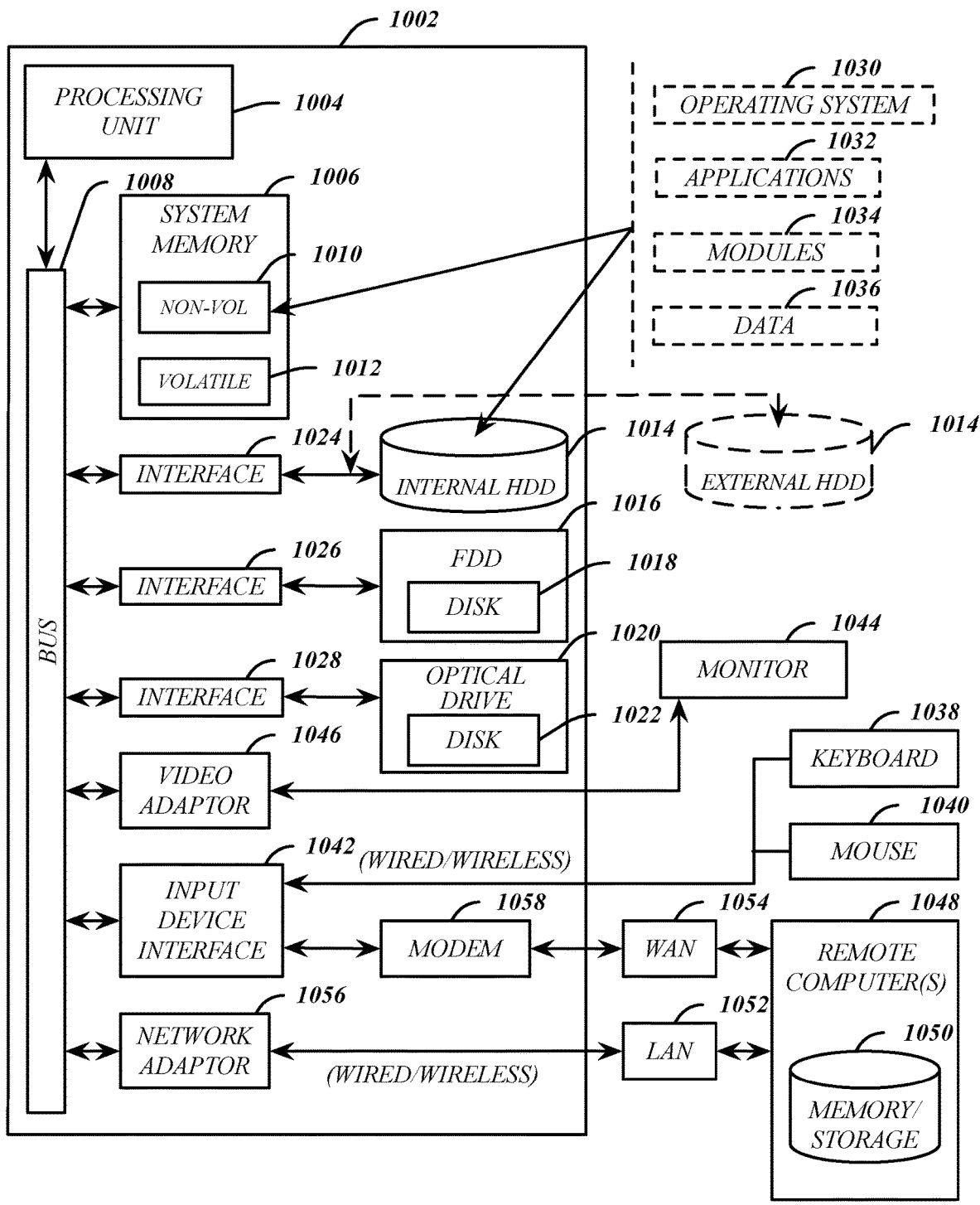
FIG. 10 illustrates an embodiment of a computing architecture.

FIG. 10 illustrates an embodiment of an exemplary computing architecture 1000 suitable for implementing various embodiments as previously described. In one embodiment, the computing architecture 1000 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1000. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1000 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1000.

As shown in FIG. 10, the computing architecture 1000 comprises a processing unit 1004, a system memory 1006 and a system bus 1008. The processing unit 1004 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1004.

The system bus 1008 provides an interface for system components including, but not limited to, the system memory 1006 to the processing unit 1004. The system bus 1008 can be any of several types of bus structure that may further interconnect to a memory bus (with or without a memory controller), a peripheral bus, and a local bus using any of a variety of commercially available bus architectures. Interface adapters may connect to the system bus 1008 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1000 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1006 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 10, the system memory 1006 can include non-volatile memory 1010 and/or volatile memory 1012. A basic input/output system (BIOS) can be stored in the non-volatile memory 1010.

The computer 1002 may include various types of computer-readable storage media in the form of one or more lower speed memory units, including an internal (or external) hard disk drive (HDD) 1014, a magnetic floppy disk drive (FDD) 1016 to read from or write to a removable magnetic disk 1018, and an optical disk drive 1020 to read from or write to a removable optical disk 1022 (e.g., a CD-ROM or DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1010, 1012, including an operating system 1030, one or more application programs 1032, other program modules 1034, and program data 1036. In one embodiment, the one or more application programs 1032, other program modules 1034, and program data 1036 can include, for example, the various applications and/or components of the system 100.

A user can enter commands and information into the computer 1002 through one or more wire/wireless input devices, for example, a keyboard 1038 and a pointing device, such as a mouse 1040. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, and so forth.

A monitor 1044 or other type of display device is also connected to the system bus 1008 via an interface, such as a video adaptor 1046. The monitor 1044 may be internal or external to the computer 1002. In addition to the monitor 1044, a computer typically includes other peripheral output devices, such as speakers, printers, and so forth.

The computer 1002 may operate in a networked environment using logical connections via wire and/or wireless communications to one or more remote computers, such as a remote computer 1048. The remote computer 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, connects to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.10 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.10x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 11:
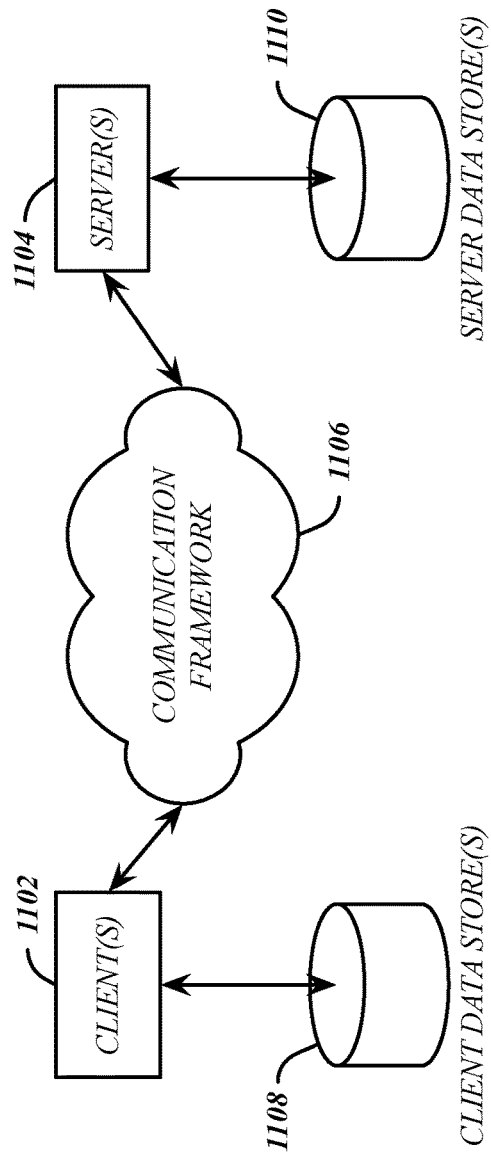
FIG. 11 illustrates an embodiment of a communications architecture.

FIG. 11 illustrates a block diagram of an exemplary communications architecture 1100 suitable for implementing various embodiments as previously described. The communications architecture 1100 includes various common communications elements, such as a transmitter, receiver, transceiver, radio, network interface, baseband processor, antenna, amplifiers, filters, power supplies, and so forth. The embodiments, however, are not limited to implementation by the communications architecture 1100.

As shown in FIG. 11, the communications architecture 1100 comprises includes one or more clients 1102 and servers 1104. The clients 1102 may correspond to the client devices 120, 420, 425. The servers 1104 may correspond to the server devices 820, 950 and the servers 190. The clients 1102 and the servers 1104 are operatively connected to one or more respective client data stores 1108 and server data stores 1110 that can be employed to store information local to the respective clients 1102 and servers 1104, such as cookies and/or associated contextual information.

The clients 1102 and the servers 1104 may communicate information between each other using a communication framework 1106. The communications framework 1106 may implement any well-known communications techniques and protocols. The communications framework 1106 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1106 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1102 and the servers 1104. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 12:
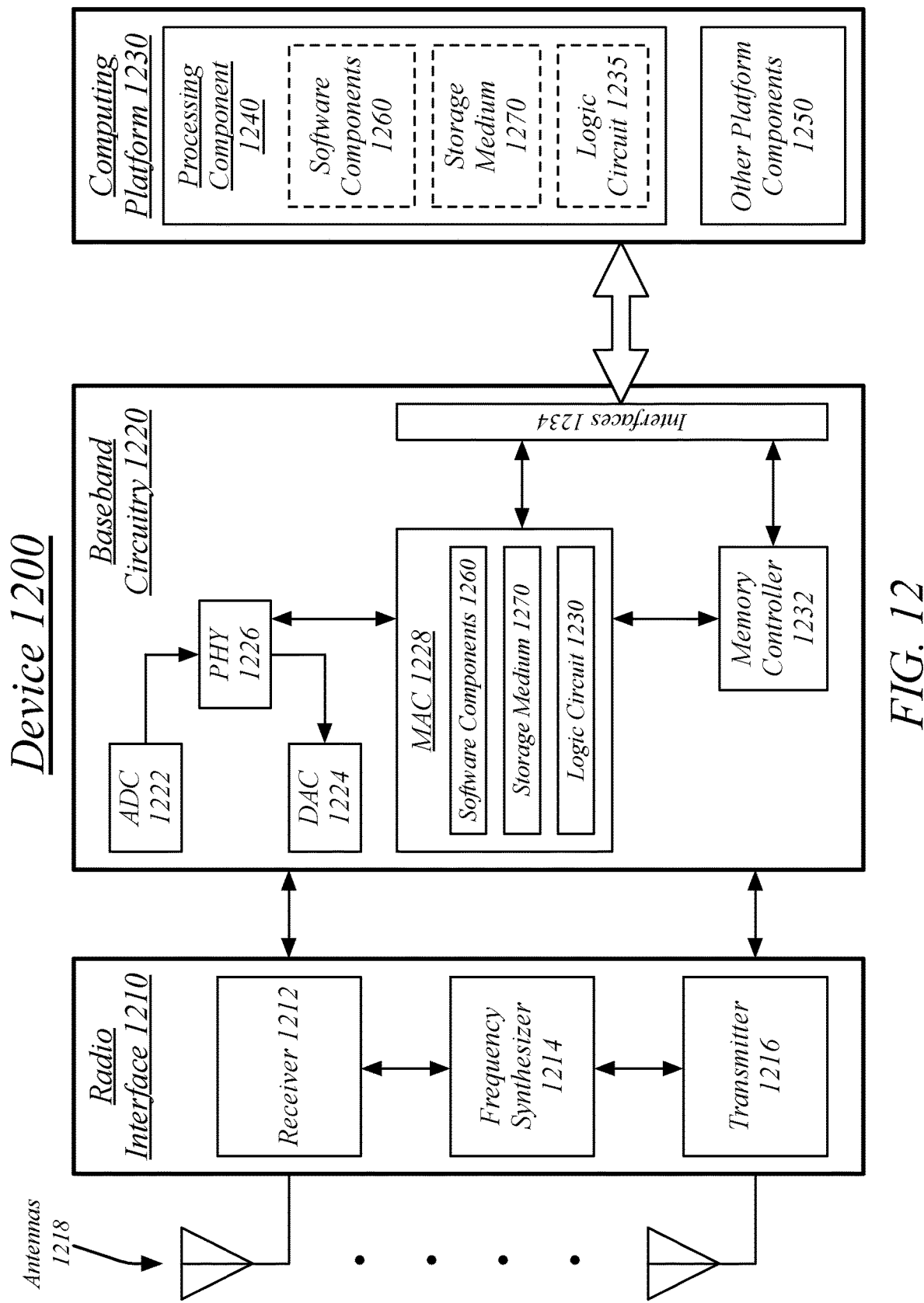
FIG. 12 illustrates an embodiment of a radio device architecture.

FIG. 12 illustrates an embodiment of a device 1200 for use in a multicarrier OFDM system, such as the system 100. Device 1200 may implement, for example, software components 1260 as described with reference to system 100 and/or a logic circuit 1235. The logic circuit 1235 may include physical circuits to perform operations described for the system 100. As shown in FIG. 12, device 1200 may include a radio interface 1210, baseband circuitry 1220, and computing platform 1230, although embodiments are not limited to this configuration.

The device 1200 may implement some or all of the structure and/or operations for the system 100 and/or logic circuit 1235 in a single computing entity, such as entirely within a single device. Alternatively, the device 1200 may distribute portions of the structure and/or operations for the system 100 and/or logic circuit 1235 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1210 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1210 may include, for example, a receiver 1212, a transmitter 1216 and/or a frequency synthesizer 1214. Radio interface 1210 may include bias controls, a crystal oscillator and/or one or more antennas 1218. In another embodiment, radio interface 1210 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1220 may communicate with radio interface 1210 to process receive and/or transmit signals and may include, for example, an analog-to-digital converter 1222 for down converting received signals, a digital-to-analog converter 1224 for up converting signals for transmission. Further, baseband circuitry 1220 may include a baseband or physical layer (PHY) processing circuit 1256 for PHY link layer processing of respective receive/transmit signals. Baseband circuitry 1220 may include, for example, a processing circuit 1228 for medium access control (MAC)/data link layer processing. Baseband circuitry 1220 may include a memory controller 1232 for communicating with processing circuit 1228 and/or a computing platform 1230, for example, via one or more interfaces 1234.

In some embodiments, PHY processing circuit 1226 may include a frame construction and/or detection module, in combination with additional circuitry such as a buffer memory, to construct and/or deconstruct communication frames, such as radio frames. Alternatively or in addition, MAC processing circuit 1228 may share processing for certain of these functions or perform these processes independent of PHY processing circuit 1226. In some embodiments, MAC and PHY processing may be integrated into a single circuit.

The computing platform 1230 may provide computing functionality for the device 1200. As shown, the computing platform 1230 may include a processing component 1240. In addition to, or alternatively of, the baseband circuitry 1220, the device 1200 may execute processing operations or logic for the system 100 and logic circuit 1235 using the processing component 1240. The processing component 1240 (and/or PHY 1226 and/or MAC 1228) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1230 may further include other platform components 1250. Other platform components 1250 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1200 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1200 described herein, may be included or omitted in various embodiments of device 1200, as suitably desired. In some embodiments, device 1200 may be configured to be compatible with protocols and frequencies associated one or more of the 3GPP LTE Specifications and/or IEEE 1202.16 Standards for WMANs, and/or other broadband wireless networks, cited herein, although the embodiments are not limited in this respect.

Embodiments of device 1200 may be implemented using single input single output (SISO) architectures. However, certain implementations may include multiple antennas (e.g., antennas 1218) for transmission and/or reception using adaptive antenna techniques for beamforming or spatial division multiple access (SDMA) and/or using MIMO communication techniques.

The components and features of device 1200 may be implemented using any combination of discrete circuitry, application specific integrated circuits (ASICs), logic gates and/or single chip architectures. Further, the features of device 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

An apparatus may comprise a processor circuit on a device; a first load balancer component operative to receive a first-client relay bind request from a first client device, the first client device associated with a first network address, the first relay bind request associated with a first client device identifier for the first client device; determine a first relay server component based on the first client device identifier by applying a hashing function to the first client device identifier; and forward the first-client relay bind request to the first relay server component; the first relay server component operative on the processor circuit to receive the first-client relay bind request from the first load balancer component; extract a session identifier from the first-client relay bind request; and register the first client device in association with the session identifier in a persistent shared-memory storage component; a second load balancer component operative to receive a second-client relay bind request from a second client device, the second-client relay bind request associated with a second client device identifier for the second client device; determine a second relay server component based on the second client device identifier by applying the hashing function to the second client device identifier; forward the second-client relay bind request to the second relay server component; receive a second-client relay network packet from the second client device, the second-client relay network packet associated with the second client device identifier for the second client device; determine the second relay server component based on the second client device identifier by applying the hashing function to the second client device identifier; and forward the second-client relay network packet to the second relay server component; the second relay server component operative to receive the second-client relay bind request from the second load balancer component; extract the session identifier from the second-client relay bind request; access the persistent shared-memory storage component based on the session identifier; retrieve the first network address based on accessing the persistent shared-memory storage component based on the session identifier; associate the first network address as a relay destination for the second client device; receive the second-client relay network packet from the second load balancer component; identify the second client device based on the second network address; and transmit the second-client relay network packet to the first client device based on the first network address in response to identifying the second client device based on the second network address.

An apparatus may further comprise wherein retrieving the first network address based on accessing the persistent shared-memory storage component based on the session identifier comprises retrieving the first network address from the persistent shared-memory storage component based on the session identifier.

An apparatus may further comprise wherein retrieving the first network address based on accessing the persistent shared-memory storage component based on the session identifier comprises retrieving a first relay server component identifier for the first relay server component from the persistent shared-memory storage component and retrieving the first network address from the first relay server component.

An apparatus may further comprise the first client device identifier comprising the first network address for the first client device, the second client device identifier comprising the second network address for the second client device.

An apparatus may further comprise the second relay server component operative on the processor circuit to register the second network address for the second client device in association with the session identifier in the persistent shared-memory storage component; the first load balancer component operative to receive a first-client relay network packet from the first client device, the first-client relay network packet associated with the first client device identifier for the first client device; determine the first relay server component based on the first client device identifier by applying the hashing function to the first client device identifier; and forward the first-client relay network packet to the first relay server component; the first relay server component operative to receive the first-client relay network packet from the first load balancer component; identify the first client device based on the first network address; and transmit the first-client relay network packet to the second client device based on the second network address in response to identifying the first client device based on the first network address.

An apparatus may further comprise the first relay server component operative on the processor circuit to extract a key index from the first-client relay bind request; extract an encrypted token from the first-client relay bind request; retrieve an encryption key from an encryption key table based on the key index; generate an unencrypted token by decrypting the encrypted token using the encryption key; and extract the session identifier from the first-client relay bind request by extracting the session identifier from the unencrypted token.

An apparatus may further comprise a relay initiation component operative to receive a relay system request for the first client device and the second client device; generate the unencrypted token, the unencrypted token comprising the session identifier; generate the encrypted token by encrypting the unencrypted token using the encryption key; augment the encrypted token with the key index; transmit the encrypted token to the first client device; and transmit the encrypted token to the second client device.

An apparatus may further comprise a relay server pool comprising the first load balancer component, the second load balancer component, the first relay server component, and the second relay server component, the relay server pool associated with a geographic service area, wherein the encryption key table for the geographic service area comprises null entries; the relay initiation component operative to select the key index to avoid the null entries based on the relay server pool being associated with the geographic service area.

An apparatus may further comprise the relay initiation component operative to receive a key rotation command, the key rotation command specifying the key index for use in encrypting tokens, the key index replacing a previous key index used for encrypting tokens.

An apparatus may further comprise the relay initiation component operative to receive a key replacement command, the key replacement command specifying a replacement key for the encryption key table at the previous key index; and store the replacement key at the previous key index in the encryption key table.

A computer-implemented method may comprise receiving a first-client relay bind request from a first load balancer component at a first relay server component, the first-client relay bind request forwarded from the first load balancer component after reception from a first client device, the first client device associated with a first network address, the first relay bind request associated with a first client device identifier for the first client device; extracting a session identifier from the first-client relay bind request by the first relay server component; registering the first client device in association with the session identifier in a persistent shared-memory storage component by the first relay server component; receiving a second-client relay bind request from a second load balancer component at a second relay server component, the second-client relay bind request forwarded from the second load balancer component after reception from a second client device, the second-client relay network packet associated with a second client device identifier for the second client device; extracting the session identifier from the second-client relay bind request; accessing the persistent shared-memory storage component based on the session identifier; retrieving the first network address based on accessing the persistent shared-memory storage component based on the session identifier; associating the first network address as a relay destination for the second client device; receiving a second-client relay network packet from the second load balancer component, the second-client relay network packet forwarded from the second load balancer component after reception from the second client device; identifying the second client device based on the second network address; and transmitting the second-client relay network packet to the first client device based on the first network address in response to identifying the second client device based on the second network address. Computer-implemented methods may be operative to perform any of the operations of an apparatus described herein.

At least one computer-readable storage medium may comprise instructions that, when executed, cause a system to perform any of the computer-implemented methods or operations of an apparatus described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/ or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
extracting a first session identifier from a first token, the first token unencrypted from a first encrypted token received from a first client device using a first key retrieved, based on a first index from first relay information of a first-client bind request, from an encryption key table;
registering a network address of the first client device with the first session identifier in a memory;
extracting a second session identifier from a second token, the second token unencrypted from a second encrypted token received from a second client device using a second key retrieved, based on a second index from second relay information of a second-client bind request, from the encryption key table, wherein the first relay information and the second relay information are the same, the first index and the second index are the same, and the first session identifier and the second session identifier are the same;
retrieving the network address from the memory based on the second session identifier; and
transmitting a network packet from the second client device to the network address.

2. The method of claim 1, wherein the first encrypted token comprises the first session identifier encrypted using the first key, and wherein the second encrypted token comprises the second session identifier encrypted using the second key.

3. The method of claim 2, the first relay information comprising the first encrypted token, wherein the first encrypted token from the first relay information has been augmented with the first index, the first index in an unencrypted form, and the second relay information comprising the second encrypted token, wherein the second encrypted token from the second relay information has been augmented with the second index, the second index in an unencrypted form.

4. The method of claim 1, wherein the first key and second key are associated with one or more specific relay systems for use with the one or more specific relay systems, wherein the first encrypted token uses the first key based on the first key's association with the one or more specific relay systems, and wherein the second encrypted token uses the second key based on the second key's association with the one or more specific relay systems.

5. The method of claim 4, wherein the one or more specific relay systems are transmitted in the encryption key table, wherein the encryption key table comprises null entries in a general shared portion of the encryption key table and filled entries in a region-specific portion of the encryption key table.

6. The method of claim 1, wherein the encryption key table is distributed among various relay systems.

7. The method of claim 1, wherein the encryption key table comprises multiple keys, wherein each of the multiple keys is at a particular key index and wherein one or more of the multiple keys has been updated based on a key rotation command.

8. The method of claim 1, further comprising receiving the first-client bind request from a first load balancer component and receiving the second-client bind request from a second load balancer component.

9. A non-transitory computer-readable storage medium comprising instructions which, when executed, cause a system to:
extract a first session identifier from a first token, the first token unencrypted from a first encrypted token received from a first client device using a first key retrieved, based on a first index from first relay information of a first-client bind request, from an encryption key table;
register a network address of the first client device with the first session identifier in a memory;
extract a second session identifier from a second token, the second token unencrypted from a second encrypted token received from a second client device using a second key retrieved, based on a second index from second relay information of a second-client bind request, from the encryption key table, wherein the first relay information and the second relay information are the same, the first index and the second index are the same, and the first session identifier and the second session identifier are the same;

retrieve the network address from the memory based on the second session identifier; and transmit a network packet from the second client device to the network address.

10. The computer-readable storage medium of claim 9, wherein the first encrypted token comprises the first session identifier encrypted using the first key, and wherein the second encrypted token comprises the second session identifier encrypted using the second key.

11. The computer-readable storage medium of claim 10, the first relay information comprising the first encrypted token, wherein the first encrypted token from the first relay information has been augmented with the first index, the first index in an unencrypted form, and the second relay information comprising the second encrypted token, wherein the second encrypted token from the second relay information has been augmented with the second index, the second index in an unencrypted form.

12. The computer-readable storage medium of claim 9, wherein the first key and second key are associated with one or more specific relay systems for use with the one or more specific relay systems, wherein the first encrypted token uses the first key based on the first key's association with the one or more specific relay systems, and wherein the second encrypted token uses the second key based on the second key's association with the one or more specific relay systems.

13. The computer-readable storage medium of claim 12, wherein the one or more specific relay systems are transmitted in the encryption key table, and wherein the encryption key table comprises null entries in a general shared portion of the encryption key table and filled entries in a region-specific portion of the encryption key table.

14. The computer-readable storage medium of claim 9, wherein the encryption key table is distributed among various relay systems.

15. The computer-readable storage medium of claim 9, wherein the encryption key table comprises multiple keys, wherein each of the multiple keys is at a particular key index.

16. The computer-readable storage medium of claim 15, wherein one or more of the multiple keys has been updated based on a key rotation command.

17. The computer-readable storage medium of claim 9, further comprising instructions which, when executed, cause the system to receive the first-client bind request from a first load balancer component and receive the second-client bind request from a second load balancer component.

18. An apparatus, comprising:
a processor circuit on a device;
a first relay server component operative to:
extract a first session identifier from a first token, the first token unencrypted from a first encrypted token received from a first client device using a first key retrieved, based on a first index from first relay information of a first-client bind request, from an encryption key table; and
register a network address of the first client device with the first session identifier in a memory; and
a second relay server component operative to:
extract a second session identifier from a second token, the second token unencrypted from a second encrypted token received from a second client device using a second key retrieved, based on a second index from second relay information of a second-client bind request, from the encryption key table, wherein the first relay information and the second relay information are the same, the first index and the second index are the same, and the first session identifier and the second session identifier are the same;
retrieve the network address from the memory based on the second session identifier; and
transmit a network packet from the second client device to the network address.

19. The apparatus of claim 18, the first relay information comprising the first encrypted token and the second relay information comprising the second encrypted token, wherein the first encrypted token has been augmented with the first index and comprises the first session identifier encrypted using the first key, the first index being unencrypted, and wherein the second encrypted token has been augmented with the second index and comprises the second session identifier encrypted using the second key, the second index being unencrypted.

20. The apparatus of claim 18, wherein the first relay server component is operative to receive the first-client bind request from a first load balancer component and wherein the second relay server component is operative to receive the second-client bind request from a second load balancer component.

* * * * *